US008457880B1

(12) United States Patent
Malalur et al.

(10) Patent No.: US 8,457,880 B1
(45) Date of Patent: Jun. 4, 2013

(54) TELEMATICS USING PERSONAL MOBILE DEVICES

(71) Applicants: Paresh Govind Malalur, Cambridge, MA (US); Hari Balakrishnan, Belmont, MA (US); Samuel Ross Madden, Newton, MA (US)

(72) Inventors: Paresh Govind Malalur, Cambridge, MA (US); Hari Balakrishnan, Belmont, MA (US); Samuel Ross Madden, Newton, MA (US)

(73) Assignee: Cambridge Mobile Telematics, Cambridge, MA (US)

( * ) Notice: Subject to any disclaimer, the term of this patent is extended or adjusted under 35 U.S.C. 154(b) by 0 days.

(21) Appl. No.: 13/687,479

(22) Filed: Nov. 28, 2012

(51) Int. Cl.
*G01C 21/00* (2006.01)
(52) U.S. Cl.
USPC .......................................... 701/410

(58) Field of Classification Search
USPC .......................... 701/408, 409, 410, 522, 541
See application file for complete search history.

(56) References Cited

U.S. PATENT DOCUMENTS

| | | | | |
|---|---|---|---|---|
| 2007/0021914 A1* | 1/2007 | Song | ............................. | 701/213 |
| 2013/0030873 A1* | 1/2013 | Davidson | ..................... | 705/7.36 |

* cited by examiner

*Primary Examiner* — Kim T Nguyen
(74) *Attorney, Agent, or Firm* — Occhiuti Rohlicek & Tsao LLP

(57) ABSTRACT

An approach to telematics using mobile devices provides battery-efficient trajectory and mileage inference from inaccurate and intermittent location data. Accurate trajectories of how users or vehicles move in the physical world are formed by processing raw position estimates obtained from noisy, inaccurate, and error-prone position sensors on mobile devices, where the position data may also arrive intermittently with long time gaps. The trajectory is formed using the process of map matching, which determines the trajectory on a map that best explains the sequence of position observations.

30 Claims, 3 Drawing Sheets

```
Traverse(S_0, *, S_N) :
M_{i,j} = φ ;
for i = 0, 1, . . . N do
    PruneSpace(S_i, M_{0,i}) ;
    w ← GetWindowSize(S_{i→n}, O_{i→n});
    for j = i + w, i + w - 1, . . . i + 1 do
        M_{0,j} = M_{0,j} ⋃ Join(M_{0,i}, Traverse(S_i, φ, S_j)) ;
        M_{0,j} = Best(M_{0,j});
    end
end
```

```
Traverse(S_0, *, S_N) :
M_{i,j} = φ ;
for i = 0, 1, . . . N do
    PruneSpace(S_i, M_{0,i}) ;
    w ← GetWindowSize(S_{i→n}, O_{i→n});
    for s_a ∈ S_i do
        for j = i + w, i + w - 1, . . . i + 1 do
            for s_b ∈ S_j do
                if ¬PoorTransition(O, S, M, i, j, a, b) then
                    M_{0,j} = M_{0,j} ⋃ Join(M_{0,i}, Traverse(s_a, φ, s_b)) ;
                end
            end
            M_{0,j} = Best(M_{0,j});
        end
    end
end
```

FIG. 4

TELEMATICS USING PERSONAL MOBILE DEVICES

BACKGROUND

This invention relates to telematics, and more particularly to the use of personal mobile devices for such telematics.

Telematics includes the use of a combination of one or more of computing, communication, positioning systems, and sensor technologies for vehicle monitoring and navigation tasks. An important requirement in many telematics applications is to determine the trajectory (path) taken by a vehicle on a road network, a task referred to as "map matching". To aid map matching, a digitized model of a road network is represented as interconnected road segments, and some positioning technology located in the vehicle is used to obtain approximate positions as a function of time. In most current approaches, positioning information is obtained using a Global Positioning System (GPS) receiver in the vehicle. This location information has inherent uncertainty, and may also suffer from outages in certain areas of the world, such as around tall buildings, in "urban canyons", or inside tunnels. However, when combined with the model of the road network, and in some cases with a model of a vehicle's motion on the road network, an estimate of the trajectory of the vehicle on the road network can be computed. Another aspect of telematics is determining the velocity and acceleration of a vehicle as a function of time. A common approach is to use GPS for this purpose, using the GPS receiver's velocity estimates (computed after some smoothing) and computing its time-derivative to estimate acceleration, or even computing time-derivatives of GPS positions to estimate the velocity and acceleration of the vehicle. Another approach is to use embedded sensor-equipped hardware such as a MEMS accelerometer mounted in a known position and orientation to obtain this information (either using sensors on the hardware or from the vehicle's internal sensors).

To cope with the uncertainty in position estimates, one approach to map matching is to use a Hidden Markov Model (HMM). HMM approaches make use of a prior model in which a vehicle's path through a road network is assumed to obey a Markov (memoryless) process, and the position observations made at successive times are assumed to conditionally independent of the road segment the vehicle was on at that time point. Each position observation yields a probability distribution of a vehicle's location on the road network given only that measurement, and the task is to determine the hidden states (in this case, the road segments along the path) of the Markov process that best explain the uncertain position observations. HMM techniques, such as the Viterbi Algorithm, provide a way to perform inference on this Markovian probability model to determine the most likely path by taking into account the observations at previous time-steps, the inferred vehicle partial paths and prior beliefs on these vehicle paths. By computing scores for various paths between observations, an HMM produces a trajectory. This method has been applied to GPS data in Krumm et al., "Map Matching with Travel Time Constraints," *SAE World Congress*, 2007, and to GPS as well 802.11-radio-based position data by Thiagarajan et al., "VTrack: Accurate, Energy-aware Road Traffic Delay Estimation using Mobile Phones", *SenSys* 2009. These are incorporated herein by reference.

It is well known that GPS location may be difficult to acquire or is inaccurate in some locations, for example, in so-called urban canyons in locations near tall buildings, as well as inside tunnels. As an alternative, approaches have been developed that use mapped locations of wireless local area network (802.11, also known as "WiFi") transmitters (e.g., access points) to provide estimates of a location of a receiver. However, such WiFi-based location estimates may have high error as well, typically between 50 meters and 500 meters. In addition, WiFi access point transmitters could have moved or gone offline since the original mapping was done, increasing and error and uncertainty in the position estimate. An alternative to WiFi position data is cellular position data, which is based on mapped locations of cellular base stations. Such position estimates can have errors between several hundred meters and up to 4 or 5 kilometers from the true position because of the longer range of cellular radios.

An approach to use HMM techniques to process WiFi position data are described in Thiagarajan et al., "VTrack: Accurate, Energy-aware Road Traffic Delay Estimation using Mobile Phones", *SenSys* 2009. An approach to use HMM techniques with cellular position data is described in Thiagarajan et al., "Accurate, Low-Energy Trajectory Mapping for Mobile Devices", *8th USENIX Symp. on Networked Systems Design and Implementation (NSDI)*, 2011. These are incorporated herein by reference.

On personal communication devices such as smartphones and mobile phones, telematics implemented with frequent GPS sampling results in unacceptably short battery life, because the GPS chips performing the sampling often consume significant power. Overcoming this shortcoming to enable energy-efficient telematics on personal mobile devices requires new methods.

SUMMARY

In one aspect, an approach to energy-efficient telematics using mobile devices includes a combination of one or more of the following features.

One feature is accurate, battery-efficient trajectory and mileage inference from inaccurate and intermittent location data. Accurate trajectories of how users or vehicles move in the physical world are formed by processing raw position estimates obtained from noisy, inaccurate, and error-prone position sensors on mobile devices, where the position data may also arrive intermittently with long time gaps. The trajectory is formed using the process of map matching, which determines the trajectory on a map that best explains the sequence of position observations. The raw position estimates may come from a combination of cellular radios with an accuracy of only a few kilometers or several hundred meters, shorter-range radios like 802.11 (WiFi) with an accuracy of a few tens to a few hundreds of meters, or by sampling of a GPS receiver on the mobile device. GPS may also be highly inaccurate or unavailable in urban canyons. A noteworthy feature is that even highly infrequent GPS or no GPS information can be handled. The advantage of these position sensors, instead of GPS, is energy-efficiency, which is a particularly desirable property on battery-operated devices. For example, measurements conducted on Apple's iPhone4 hardware using a mobile telematics application show that continuous GPS monitoring during a drive reduces the overall battery lifetime of the device by a factor of 10 compared to a solution that uses cellular and WiFi radios. Similar measurements on various devices running the Android operating system show gains between a factor of 7 and 10. Similarly, infrequent and occasional use of the GPS consumes far less battery power compared to continuous GPS monitoring (e.g. GPS every 1-10 seconds). Hence, an energy-efficient telematics solution on personal communication devices should sample GPS infrequently, if at all, and rely instead on energy-efficient position sensors (whose data may have higher inherent error).

Accurate map matching from inaccurate and intermittent location data has applications in insurance telematics, travel-delay information services and traffic-aware navigation, driver behavior monitoring, road surface quality monitoring, determining hazardous driving conditions, and several other location-based services. In insurance telematics, the user's driving behavior such as the trajectories (locations) traveled and mileage at various times may be used to assess driver risk and set prices (or provide rebates). Map matching provides the required telematics information for this purpose. In this application, map matching need not occur in "real time" during a drive, but may be done after the drive has ended.

Map matching using inaccurate position data from low-energy sensors is well-suited for use with mobile devices such as smartphones, where battery consumption issues are a significant problem. Accordingly, the use of noisy, but battery-efficient location sensors such as cellular radios and WiFi may be used instead of periodic or continuous GPS sampling, saving significant energy and improving battery life. With accurate map-matching, the extreme inaccuracies in trajectory mapping caused by the lack of continuous GPS can be overcome, providing accurate telematics information.

Another feature is to approach the map-matching problem as a set of consecutive overlapping path computations. This approach uses the intuition that if we are traversing through a sequence of "locales" A-B-C-D, then there is a high likelihood of an overlap of the likely trajectories from A to C and from B to D. The overlapping trajectory approach does not rely on a Markovian assumption on the data that characterizes many prior art approaches, which generally apply Hidden Markov Models (HMMs) or similar probabilistic models. Each observation is not necessarily processed sequentially. Instead observations are processes in non-disjoint groups. Trajectory scores for paths in the road network corresponding to a set of not necessarily successive observations are determined independently of the observations. Then, fitness scores for paths are computed based on how well they match intermediate position observations (for example, the fitness score of a path may be calculated by taking the squared sum of the distance of each original observation from the path, weighted by the accuracy of the observation sample). Finally, these scores are combined to produce the final score for a path. Different paths are ranked according to this score to produce the final most-likely trajectory.

Yet another feature is an inference algorithm, which finds the most likely trajectory under the overlapping trajectory constraints in a feasible, scalable manner. The Viterbi algorithm used to solve traditional HMMs is not appropriate because it depends on the Markovian assumption, which does not hold due to the processing of observations in groups. The inference method is able to map-match correctly in a wide range of scenarios, including (but not limited to): (1) drives local to a small region with a potentially high density of observations, all the way to drives that span multiple states or countries over a few thousand kilometers (2) drives spanning regions of highly varying road densities—from dense urban settings as in cities to sparse unpopulated regions, and (3) drives with highly variable density of position observations (in space and in time).

Yet another feature is an approach to fast map matching using fast graph search. Generally, when location data is both inaccurate and very intermittent (gaps of hundreds of km), one needs to explore many paths because several potential paths exist in the road network. An approach to fast map matching includes use of clusters of consistent observations, and using pre-computation of paths and costs between locations in a road network to form trajectory estimates between the intermittent measurements.

Another feature of telematics using personal mobile devices is the accurate inference of vehicular acceleration and velocity with commodity personal mobile devices. Commodity mobile devices such as smartphones often come equipped with three-axis accelerometers. Producing accurate longitudinal acceleration (in the direction of the vehicle's movement), lateral acceleration (perpendicular to the direction of movement), vertical acceleration (perpendicular to the surface of the road), and velocity is a desirable feature. The challenge lies in accurately processing information from the sensors on a personal mobile device, particularly when the device may be placed arbitrarily or oriented arbitrarily in a moving vehicle (or carried by a moving user), and when the orientation and position may change arbitrarily. This feature of the invention does not require assuming that the device is in a fixed or known orientation. It also does not require a prior process of calibrating the device to correct for drifts and errors in the raw acceleration data. The feature also does not require human intervention to notify it of times when the device has been moved relative to the moving user or vehicle. The feature can include the capability to handle a vehicle or user traversing slopes and hills of different unknown grades as well as variations in temperature that cause further errors in acceleration data. In some examples, longitudinal acceleration samples are integrated to produce accurate velocity estimates, even in the face of the inherent errors in the raw data. In some examples, any available GPS-based velocity samples are integrated into the acceleration output produced.

By processing three-axis accelerometer data principally, instead of GPS exclusively, to infer vehicular acceleration (longitudinal, lateral, and vertical) and velocity, two significant benefits are gained. First, because the velocity reported by GPS devices are smoothed estimates, the resulting acceleration computations usually miss sudden changes in acceleration caused by events like hard braking or forward movement. Second, GPS significantly drains the battery on mobile phones, unlike the three-axis accelerometer, which consumes much less energy. Accordingly, examples of this feature can include accurately obtaining acceleration and velocity information from mobile phones, capturing sudden changes in acceleration while significantly reducing the battery impact compared to continually sampling GPS.

Yet another feature is a method for integrating map matching with acceleration and speed estimation. Processing acceleration, gyroscope, and compass data to identify periods of rest, low speed, and turns produces useful input to map matching. Conversely, knowledge from the map-matcher about the road type, speed limits, and other properties of the trajectory is useful input to accelerometer processing. For example, map matching produces information about turns in the trajectory. After the turns are observed, the approach determines the time when those turns occurred from acceleration information, which allows map matching to refine its estimate of where and when the turn occurred. As a second example, knowledge of the trajectory and road network may be combined with altitude information to make corrections to the inferred acceleration and velocity.

In another aspect, in general, a method for map-based telematics includes acquiring data representing a sequence of position-related measurements $O_1, \ldots, O_t$ of a device traveling along segments s of a transportation network. Data representing the position measurements is processed to form a sequence of segment sets $S_0, \ldots, S_D$, each segment set being associated with a set of one or more position measurements in the sequence of position measurements. A computer-implemented path forming procedure is applied to form a path set between the segment sets $(S_0, S_D)$ including determining a plurality of subsequences $\mathcal{R}$ of the sequence $S_0, \ldots, S_D$ and forming paths through the determined subsequences. Data representation of a characteristic of the traversal of the device based on the formed path set is then provided.

Aspect can include one or more of the following features.

Determining the plurality of subsequences $\mathcal{R}$ comprises determining substantially all subsequences of the sequence $S_1, \ldots S_{D-1}$.

Applying a computer-implemented path forming procedure to form the path set representing a traversal of the transportation network between a pair of segment sets $(S_0, S_D)$ further includes determining a path set between segments in segment set $S_i$ and segments in segment set $S_j$, applying the path forming procedure to form a first intermediate path set representing traversal of the network between an intermediate pair of segments $(S_{i'}, S_{j'})$, where $i \leq i' < j' \leq j$; and determining the path set at least in part according to the formed first intermediate path set.

Applying the path forming procedure for the pair of segments $(S_i, S_j)$ further includes selecting a $k^{th}$ segment set $S_k$ that is intermediate the $i^{th}$ and $j^{th}$ segment sets such that $i < k < j$, and wherein the first intermediate path set represents traversal between either segment sets $(S_i, S_k)$ or $(S_k, S_i)$.

Applying the path forming procedure for the pair of segments $(S_i, S_j)$ further includes applying the path forming procedure to form a second intermediate path set representing traversal of the network over between an intermediate pair of segment sets $(S_i, S_k)$ or $(S_k, S_i)$, and wherein determining the path set is according to the formed first intermediate path set and the formed second intermediate path set.

Selecting a $k^{th}$ segment set $S_k$ includes comparing a plurality of the segment sets with the path set between segments in segment set $S_i$ and segments in segment set $S_j$.

The comparing of the segment sets with the path includes determining a degree of consistency of the path with each of the segment sets, and selecting a segment set with a least consistency.

The path forming procedure applied to a pair of segment sets $(S_a, S_b)$ forms a path set consisting of a single best path representing a path between a segment of $S_a$ and a segment of $S_b$.

The path forming procedure applied to a pair of segment sets $(S_a, S_b)$ forms a path set comprising a plurality of best paths each best path representing a path between a pair of segments $(S_a, S_b)$ in the corresponding pair of segment sets $(S_a, S_b)$.

At least one of the segment sets is associated with more than one of the position-related measurements.

The method further includes grouping the position-related measurements, and forming each segment set according to a corresponding one of the groups of measurements.

Providing the data representation of the characteristic of the traversal of the device comprises providing data representing a path of the traversal of the device through the transportation network.

Providing the data representation of the characteristic of the traversal of the device comprises providing data representing a distance of a path in the formed path set and a velocity characteristic of a traversal of a path in the formed path set.

Providing the data representation of the characteristic of the traversal of the device comprises providing driver risk data, for instance, directly or indirectly to an insurance provider.

The path set between segments in segment set $S_i$ and segments in segment set $S_j$ consists of a single best path between a segment of $S_i$ and a segment of $S_j$.

Determining a best path between a segment of $S_i$ and a segment of $S_j$ includes determining an overall score for the path by applying a precomputed map-based score for traversal of the network between pairs of segments of segment sets $S_i$ and $S_j$.

Determining a best path between a segment of $S_i$ and a segment of $S_j$ further includes applying measurement data acquired during travel of the device along the network in determining the overall score for the path.

The measurement data comprises at least some of the position-related measurements.

The method further includes acquiring sensor measurement data at the device during the travel of the device, and the measurement data applied in determining the overall score for a path includes at least some of the sensor measurement data.

The sensor measurement data comprises inertial measurement data.

The sensor measurement data comprises acoustic measurement data.

The position-related measurements comprise positioning system measurements.

The positioning system measurements comprise satellite positioning system measurements.

The position-related measurements comprise measurements based on radio transmissions between the device and stationary transmitters.

The radio transmissions between the device and stationary transmitters comprise cellular telephone transmissions between the device and cellular telephone base stations.

The radio transmissions between the device and stationary transmitters comprise transmissions from known wireless local area network stations to the device.

The method further includes causing acquisition of further position-related measurements according to a result of the path forming procedure.

The method further includes selecting whether to cause the acquisition according to a cost of the acquisition.

The cost of the acquisition comprises a power consumption cost.

The device comprises a personal communication device.

The personal communication device travels within a vehicle along a road transportation network.

Other features and advantages of the invention are apparent from the following description, and from the claims.

DESCRIPTION OF DRAWINGS

FIG. 4 is pseudocode for a dynamic programming implementation.

DESCRIPTION

Figure 1:
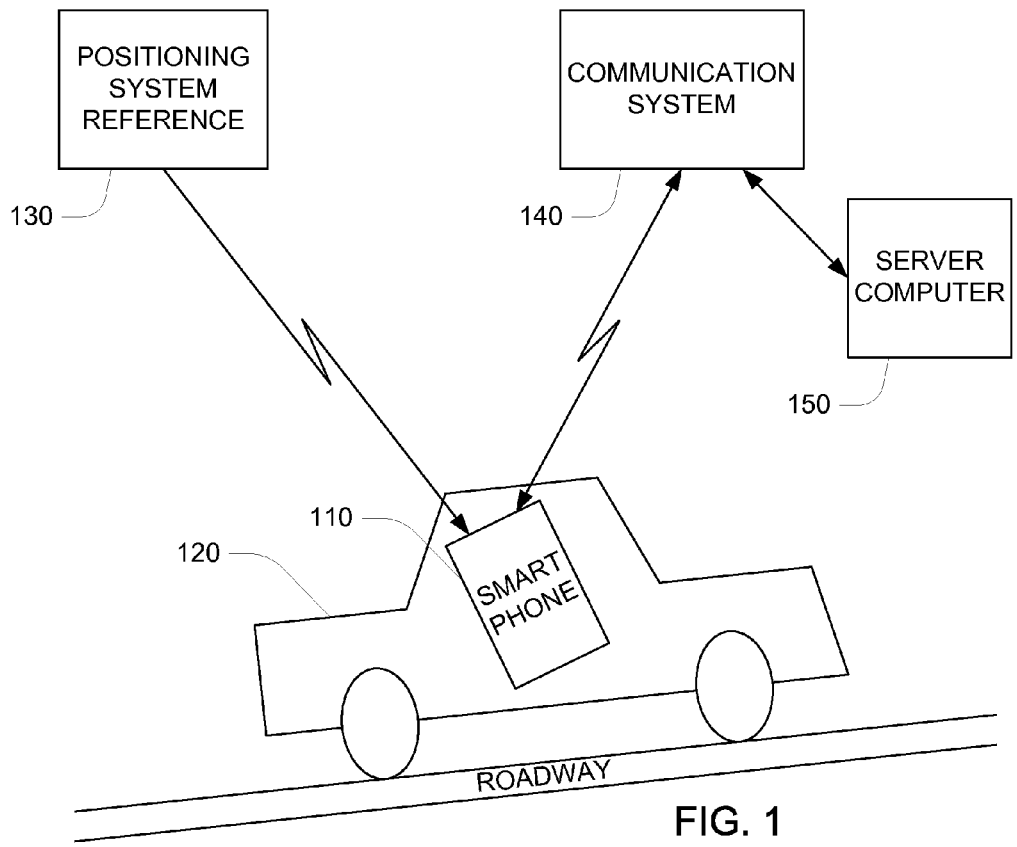
FIG. 1 is a schematic of the system context for telematics using personal mobile devices.

Referring to FIG. 1, an embodiment of a telematics system is described below in the context of use of a personal mobile device 110, such as a smartphone, that travels in a vehicle 120, to determine characteristics of a vehicle's trip though a road network, and in particular, to track the vehicle's path, mileage, velocity, and acceleration profile through the road network. In this embodiment, the smartphone is not necessarily rigidly attached to the vehicle frame of reference; for example, the smartphone may be in the pocket of a driver or passenger in the vehicle, and may be moved from time to time, changing its placement and orientation. However, it should be understood that in other embodiments, other devices, which may be fixed or embedded in a vehicle, could be used in similar ways. In addition, the techniques may be applied to other tasks, for example, tracking other forms of transportation such as bicycling, bus travel, train travel, pedestrian walking, running, etc.

Figure 2:
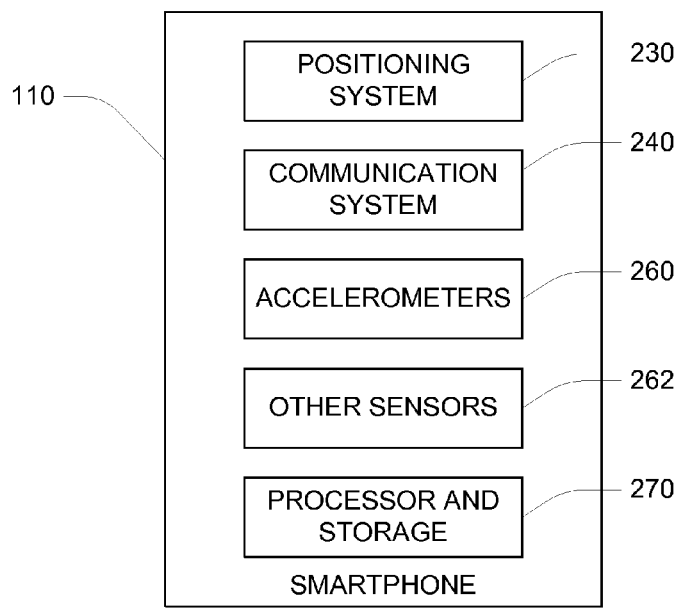
FIG. 2 is a block diagram of a smartphone implementation.

Referring to FIG. 2, the mobile device 110 is also assumed to have at least one position measurement capability, for instance, using a local communication system 240 that sends and/or receives wireless signals with a fixed communication system 140 (see FIG. 1) such as cellular position estimation using a cellular radio, and/or a WiFi receiver for WiFi position estimation, and/or a positioning system 230 which sends and/or receives position information with a positioning system reference 130 (see FIG. 1) such as via a Global Positioning System (GPS) receiver. The mobile device also optionally has inertial sensors 260, for example, a three-axis accelerometer or a 6-degree-of-freedom (DOF) inertial measurement system (three-axis accelerometer and a gyroscope) fixed to the smartphone's frame of reference. Even though such inertial sensors are not fixed to the vehicle, they can nevertheless provide useful information about the vehicle's motion. The mobile device optionally has and makes use of yet other sensors 262, such as a compass, as well as a microphone, which may provide some information about the vehicle, for example, based on engine noise. The device 110 also includes a processor and storage 270, which in some embodiments performs various computations described below.

In this embodiment, the mobile device is assumed to have a data communication capability such that it can communicate its sensor data to a server computer 150 (see FIG. 1) from time to time. As described later in this document, this capability is not essential in that at least some embodiments may be autonomous without requiring the capability to transmit data to a remote server. From time to time, the mobile device using its wireless networking capability, or by other means, delivers the sensor data logged to a server, which processes the sensor data (position observations, acceleration data, and other sensor data) to estimate telematics information, specifically, the trajectory on the road network, the mileage for the trip, portion of a trip, or collection of trips, the velocity along the roads traversed, the longitudinal (in the direction of principal movement) and lateral (perpendicular to the direction of principal movement) acceleration (or deceleration), turns during the drive, and other such telematics factors. It is possible for this method to run on the mobile device, as well as being partitioned between the mobile device and the server, in different embodiments.

The smartphone collects observations via the positioning system 230 and/or the communication system 240 as it travels through the road network. Generally, these observations provide information about the smartphone's (and therefore the vehicle's) location. Generally, this location information is imperfect in that there is an uncertainty in the vehicle's location given the measurement. For instance, the input data is represented as a sequence of <timestamp, position, accuracy> tuples with optional accuracy metrics reported for each position observation. In some embodiments, the observations are optionally augmented with other time-indexed sensor information as well as. We denote this sequence of observations by $$ObsSequence = \langle\langle t_1, P_1, acc_1 \rangle, \langle t_2, P_2, acc_2 \rangle, \ldots, \langle t_N, P_N, acc_N \rangle\rangle = \langle O_1, O_2, \ldots, O_N \rangle.$$

Note that these position observations may be separated by significant amounts of time, for example, tens of seconds, minutes, tens of minutes, or even hours for certain types of travel.

Figure 3:
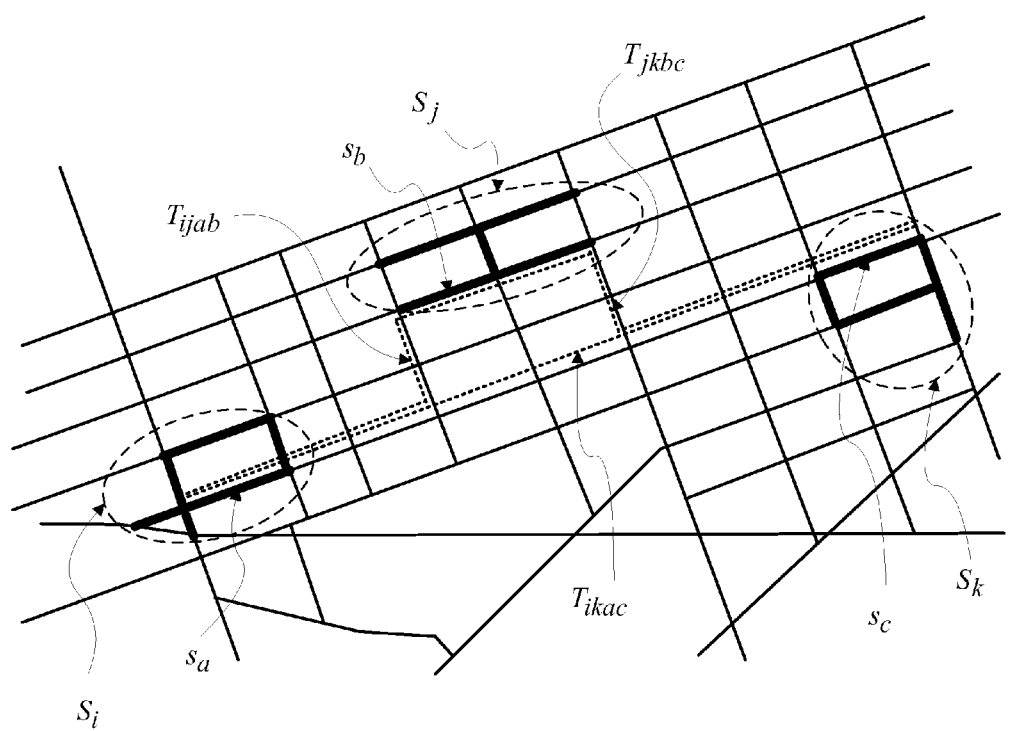
FIG. 3 depicts an example of a road map.

Referring to FIG. 3, the road network is represented in the form of a graph of road segments and adjacencies. For instance, the road network is represented as a set of interconnected segments. For the sake of exposition, these segments are assumed to link intersections in the road network, but it should be understood that smaller segments could be used in practice. A trajectory through the road network is then represented as a sequence of interconnected road segments.

One aspect of a number of embodiments described below is that the observation sequence $\langle O_1, \ldots, O_N \rangle$ corresponding to N observation times is used to form a sequence of D+1 feasible sets of segments, $\langle S_0, \ldots, S_D \rangle$. Each feasible set $S_i$ has one or more segments in the road network. For illustration, three successive feasible sets $\langle S_i, S_j, S_k \rangle$ are indicated, with the member road segments indicated by heavy lines in the road network. For example, $s_a \in S_i$ is a segment in feasible set $S_i$. These sets of feasible segments are then considered in determining a path traveled through the road network. Generally, each feasible set of segments corresponds to a number of consecutive observations, for example, relatively consistent observations, and the segments in the feasible set are those segments that have some likelihood of being a segment occupied by the vehicle at the time of the observations.

Some paths though the road network pass through each feasible set in order. For example, a path from segment $s_a \in S_i$ to segment $s_c \in S_k$ may pass through an intermediate segment in $S_j$. A number of the embodiments described below permit inferred paths to skip at least some of the feasible sets. As illustrated in FIG. 3, a direct path from $s_a$ to $s_c$ can omit all the segments of the intermediate set $S_j$. One reason to permit skipping of a feasible set is that it represents an "outlier" of observations that are not valid (e.g., for which the estimated position and accuracy are not consistent with the vehicle's true path).

A number of different implementations the path inference task use the feasible sets as described above. Very generally, an inferred path of a vehicle is associated with a "best path" through the road network that passes through a selected subsequence (i.e., subset) of the feasible sets and that fits to observation sequence well.

The approaches to trajectory inference can be implemented as a set of overlapping shortest-path computations between a sequence of sets, where each set is a set of feasible road segments. We first describe an approach to use infrequent and potentially noisy position observations in estimating a vehicle's path, followed by a description of use of other sensors in estimating the path or determining when to make such measurements. The method processes multiple observations at each stage of the method, rather than treating each observation independently and in sequence.

The principal steps (procedures) used in the method are:

a. FindFeasibleSets (ObsSequence): This procedure returns a sequence $\langle S_0, S_1, \ldots, S_D \rangle$ where each $S_i$ is the feasible set of road segments that are induced by one or more of the input position observations. After computing the sequence of feasible sets of segments, the method calls the second procedure, Traverse.

b. Traverse ($S_0$, *, $S_D$): This procedure returns the most-likely trajectory by processing the sequence of feasible sets ⟨ $S_0, S_1, \ldots, S_D$ ⟩, the original position observations ObsSequence, and the road network. The sequence of feasible sets induces a large number of potential paths between an origin set ($S_0$) and destination set ($S_D$) in the road network.

In general, Traverse (S, $\mathcal{R}$, S') takes three arguments: the first argument, S, is a set of feasible segments, the last argument, S', is another set of feasible segments, and the middle argument, $\mathcal{R}$, is a list of feasible sets, which constitutes a restriction of the set of paths that will be considered between the first and third arguments. When the restriction is the null set, ∅, paths between S and S' will be considered without regard to any intervening feasible segments; when the restriction is some non-null set $\mathcal{R}$, paths between S and S' that go through some segment in each feasible set in $\mathcal{R}$ are considered in the computation; when the restriction set is *, the desired paths are computed over all possible values of $\mathcal{R}$.

In more detail, FindFeasibleSets(⟨ $O_1, O_2, \ldots, O_N$ ⟩) takes in the N observed points and uses factors such as the rough geographic location of the observation, reported accuracy, timestamps and time difference between the observations in ObsSequence, proximity to other observations in distance, road type and characteristics such as the speed limits, whether the vehicle has stopped or not, etc. to produce its output. This output is a sequence of sets, <$S_0, S_1, \ldots, S_D$>, where each $S_i$ is a set of road segments. In general, the number of such sets will be different from the number of original position observations. Thus, FindFeasibleSets determines the possible states corresponding to the input observations. When operating on the scale of road networks of large geographic areas such as states or countries, it can be infeasible to include all road segments in the network as the feasible set corresponding to any given sequence of input position observations. Even using a simple metric like all segments within a certain radius of the data point (in prior art, such a radius is chosen to be some function of the perceived range of a position observation), the state space can become too large for scalable inference—especially in the case of observations from cellular towers obtained in regions with high road density. FindFeasibleSets instead computes a better feasible set of states.

Note that, in general, the number of elements in the sequence of feasible sets will be smaller than the number of position observations in the input (N). The reason is that FindFeasibleSets does not process each input position observation independently, but in totality. For example, if some of these input observations occur closely spaced in time or space, they are processed as a unit.

The feasible set could preferentially include a greater number of segments along certain road types (e.g., freeways or state routes) compared to other types of roads, capturing a modeling assumption on the prior behavior of typical users, specifically to capture the types of trajectories taken by typical drivers.

In more detail, Traverse takes information about the distance, time, road type, turn information from gyroscope, compass, accelerometers, or other sensors, stop information from accelerometer or other sensors, prior model of driver behavior (bias toward freeway or city streets in different situations), penalty for loops and back-tracking (importantly, even across non-successive observations) to compute, for each path, a traversal score. Without loss of generality, a higher score implies a more likely traversed path over a set of contiguous segments that connects a starting segment in $S_i$ and an ending segment in $S_j$.

Then, Traverse($S_i$, *, $S_j$) further considers other ranges between sets $S_i$ and $S_j$, and repeats Traverse($S_{i'}, \ldots, S_{j'}$) for various values of i' and j', where both i' and j' are in the range [i,j]. The scores for the various sub-ranges are combined using the various factors above and additionally using the overlapping-trajectory bias ensuring that paths where j'≦i' (i.e., where i,j' overlaps with i',j), and are high scoring paths on Traverse(i, . . . , j') and Traverse(i', . . . , j), are more likely to have a higher score on Traverse(i, . . . , j) compared to other paths.

In one embodiment, Traverse(i, . . . , j) is computed using dynamic programming; in general it can be computed using any other method for considering various sub-ranges of [i, j]. Additionally, the recursive splitting of Traverse(i, . . . , j) could be performed only when there is strong evidence that the paths being considered at the level of set $S_i$ to set $S_j$ are sub-optimal. For example, one could divide using whether the observations fall overwhelmingly on one side of the computed path spatially; if they do, one would use the last k between i and j where the points were relatively balanced, and then run Traverse(i, . . . , k) and Traverse(k, . . . , j).

In the embodiment using dynamic programming, the computation in Traverse has the following structure:

$$\text{Traverse}(S_0, *, S_D) = \text{BEST}\left(\bigcup_{0 \leq D-W \leq i \leq D} \text{Concatenate}[\text{Traverse}(S_0, *, S_i), \text{Traverse}(S_i, \emptyset, S_D)]\right)$$

Here, W is an adaptively set window size that is described later. As specified in the structure above, Traverse($S_0$, *, $S_i$) may be recursively computed by successively computing and scoring Traverse over smaller portions. Each step of Traverse has two sub-steps: one recursive call to Traverse over a smaller sequence of feasible sets, and one "direct" call to Traverse that involves no restrictions. The recursion's base case is a call to traverse with two neighboring feasible sets, i.e., Traverse($S_i$, *, $S_{i+1}$), which is equivalent to Traverse($S_i$, ∅, $S_{i+1}$).

Traverse($S_i$, *, $S_j$) produces an output $M_{ij}=\{_{ijab}, \forall_{(a,b)}: s_a \in S_i \text{ AND } s_b \in S_j\}$, where $M_{ijab}=(T_{ijab}, Z_{ijab}, R_{ijab})$ $T_{ijab}$ is the most likely trajectory (represented as a sequence, or explicitly or implicitly ordered set), or set of likely trajectories, for traversing from $s_a$ to $s_b$, $Z_{ijab}$ is the corresponding combined score for that trajectory given the observations <$O_1, O_2, \ldots, O_N$>, and $R_{ijab}$ is the corresponding restriction set used to obtain the likely trajectories.

Note that if i+1=j, then we have a base case where $R_{ijab}=\emptyset$. When invoking Traverse with a pre-determined restriction set R' by calling Traverse($S_i$, *, $S_j$), $R_{ijab}=R'$ for all (a,b). Effectively, the restriction set enforces that the probability of a trajectory $T_{ijab}$ from $s_a$ to $s_b$ is 0 if $T_{ijab}$ has no overlapping segment with R'.

JOIN takes the output of two traverse computations and merges the results together. Given $M_{ijab}$ and $M_{jlbc}$, the merging process produces $M_{ilac}$ as follows:

$T_{ilac} = T_{ijab}$ CONCATENATE $T_{jlbc}$.
$R_{ilac} = R_{ijab}$ UNION $R_{jlbc}$ UNION $S_j$.
$Z_{ilac} = $ MergeScore($M_{ijab}, M_{jlbc}$).

The function MergeScore computes the score of joining the two trajectories together. In addition to combining the scores $T_{ijab}$ and $T_{jlbc}$, this also adds in an overlap score, which favors paths where b is in one of the likely trajectory sets from a to c.

BEST takes a set of computed joins and reduces the size of this set to keep the set of likely trajectories. When there are multiple trajectories $T_{ilac}$ arising from different joins along j, BEST keeps the highest scoring trajectory after the MergeScore step. Additionally, when the highest score to a particular state t reduces to a "highly improbable" level compared to the computed scores to other states in $S_l$, then the BEST function optimizes computation for the future steps by eliminating the extremely low probability states entirely.

The "direct" call to Traverse, Traverse($S_i$, ∅, $S_j$), takes each segment in set $S_i$ and each segment in set $S_j$. Then, for each segment in $S_j$, it computes the best combined score over all paths starting from some segment in $S_i$. It maintains the [path, combined score] tuple for at least one path (in general, one could maintain the top k combined-score paths for some value of k). It is important to note that the combined score computed in the Traverse($S_i$, ∅, $S_j$) computation for each segment in $S_j$ is the score corresponding to paths from the origin feasible set, $S_i$. That is, this computation starts by considering the best combined score for each segment in $S_i$ already computed, in computing the best combined score for each segment in $S_j$.

In one embodiment, Traverse achieves the dynamic programming using an adaptive window size, W ($1 \leq W \leq D$), where D is the index of the destination feasible set in the sequence of feasible sets. For now, assume W is a constant value, such as 5; this document describes methods to select W later. In general, larger values of W result in more computation but also produce more accurate results.

In this embodiment, Traverse starts by computing Traverse ($S_0$, ∅, $S_W$); this is done by considering paths in the road network as explained in the "direct" Traverse computation above. Then, the algorithm computes Traverse($S_0$, ∅, $S_j$) for j=1, 2, . . . , W-1, or for j ranging in some subset of 1, 2, . . . , W-1.

Next, the algorithm slides the window forward by 1 to compute Traverse($S_i$, *, $S_{W+1}$) in analogous fashion. This step computes the best scores corresponding to Traverse($S_i$, ∅, $S_{j+1}$) for j=1, 2, . . . , W-1, or some subset of that. At this time, the procedure has enough information to immediately also compute Traverse($S_0$, $S_i$, $S_W$); i.e., the best combined scores for all paths between some segment in $S_0$ to $S_W$ that traverses some segment in $S_1$ with no other restrictions.

As the procedure progresses, combined scores with additional restrictions are computed. Specifically, in the next iteration, stepping the window forward by 1 computes Traverse($S_2$, *, $S_{W+2}$). This computation initially computes Traverse($S_2$, ∅, $S_{W+2}$), which provides information to go back and enter the combined scores for Traverse($S_0$, $\{S_2\}$, $S_W$) and Traverse($S_0$, $\{S_1, S_2\}$, $S_W$), as well as for Traverse ($S_1$, $\{S_2\}$, $S_{W+1}$).

Continuing these steps, the procedure is able to compute Traverse($S_0$, X, $S_W$) for several subsets X of $\{1, 2, \ldots, W\}$ (in one embodiment, for all subsets). It is advantageous that the time taken for this computation is quadratic in W, not exponential in W, making it efficient even when all subsets X are considered.

One advantage of this procedure is that one does not need to explicitly eliminate outliers in the input data. Each feasible set is considered somewhat suspect and uncertain, and the combined score is computed for paths across all combinations of restrictions on the feasible sets. The best score among these is returned. If certain sets are outliers, they are eliminated naturally, with no explicit rules forcing their elimination.

There are several other ways of computing Traverse over different restrictions. For example, to save computation time, an embodiment may compute only some of the restrictions.

Path Score Computation:

The path score computation takes information about the distance, time, road type, turn information from gyroscope, compass, accelerometers, or other sensors, stop information from accelerometer or other sensors, prior model of driver behavior (bias toward freeway or city streets in different situations), penalty for loops and back-tracking (importantly, even across non-successive observations). Without loss of generality, a higher score implies a more likely traversed path over a set of contiguous segments that connects a starting segment in $S_i$ and an ending segment in $S_j$.

Fitness Score Computation:

The fitness score computation takes a path and a set of observations and returns a measure of how well the given points explain the path. This computation takes into account the positions and accuracies of the observations and their relative positions, the type of observation (WiFi, cell tower or GPS) density of roads, and the trajectory itself in order to produce the score. Without loss of generality, a higher fitness score implies that the given observations fit the trajectory with higher likelihood.

Combined Score Computation:

The combined score computes the path score and the fitness score and combines them together to obtain a score that trades off accuracy (via fitness) for simplicity of the path (path score). If one were to follow a non-driver-like trajectory, more observations would be needed to explain this additional complexity and bring down the error.

Adaptive Window Sizing in Traverse:

To determine if the window for a feasible set $S_i$ includes $S_j$, we take into account the positions and accuracies of the distance between segments in the feasible sets, the availability of pre-computed paths between the between the feasible sets, the time between the observations, the density of observations and the skew produced by paths from $S_i$ to $S_j$ on the observations. The skew encodes the intuition that it is unlikely that a significant fraction observations error on the same side of the path.

Traverse requires many shortest path computations (where the "distance" of a path could be traversed distance, travel time of segment, or any other metric). To speed that process up, a cache of paths is beneficial. This cache may be completely pre-computed, or may be computed on-demand and then maintained for future requests to benefit from. The cache stores a set of pre-computed paths emanating out of a given segment (or, technically, the "grid" within the road network to which each segment belongs). In some embodiments, the cache may also store some components of the traversal scores, including expected travel times, turn angles, and so on. These components are combined at run time with dynamic components of the traversal score such as the prior set of visited segments.

The pre-computed set of paths corresponding to any given segment may also depend on a prior belief on typical driving patterns; in general, it is also informed by past drives. Specifically, the road type, the typical speed, the density of roads, the nature of past observations made near that location (observations in clusters means we can store fewer segments, in principle), are all used to compute cached paths.

It should be understood that there are a number of different implementations that infer a best (or set of best) paths through the road network based on the approach described above. A dynamic programming approach that is consistent with this approach can be represented is the pseudocode shown in FIG. 4.

In the above, PruneSpace takes into account the partial state of the dynamic program to prune away possible segments from the feasible sets which are guaranteed to not be on a high scoring path from the source to the destination. This method takes into account number of partial high scoring paths to that segment, the penalty incurred by adding in $S_i$ as a restriction set, the current highest relative score of the segment, etc in order to filter out those segments that are not useful. For example if $|M_{0,i,*,a}|=0$, then we can prune out $s_a$ from $S_i$ for our future calculations because we have no paths from 0 to i. Also, if we have a computed path $T_{0\,jac}$, then we can prune out segments $s_b$ from $S_i$ where $0<i<j$ and where the fitness score induced by the restriction of $s_b$ is worse than that of the trajectory $T_{0\,jac}$. Here, we are encoding the intuition that $T_{0\,jac}$ is already a high-likelihood path and that adding in a restriction $S_i$ would not improve the net traversal score. Hence, the only time we would add in a restriction $S_i$ is if the net gain from the fitness score has a potential to out-weigh this loss in traversal score.

GetWindowSize takes into account factors like location, time and accuracy of observations and the corresponding feasible sets to determine the appropriate window size. One embodiment takes into account the "skew" of observations, which chooses the largest window size such that the number of observations on left side of the straight line joining the two end points of the window is within some fraction of those lying on the right side. Another embodiment ensures that the window is the smallest possible window such that the first few feasible sets have a null intersection with the last few feasible sets.

Another implementation makes use of a recursive "splitting" approach in which $\mathcal{R}$, a list of feasible sets is initially empty and in each of a series of iterations, a feasible set is added to or taken away from $\mathcal{R}$. For example, a set $S_i$ may be added if the current best paths pass through at least one segment of $S_i$, and a set $S_j$ may be removed from $\mathcal{R}$ if the current best paths are not particularly consistent with that set.

In some embodiments, other sensors (accelerometer, gyroscope, compass, and/or microphone) are used for inferring a vehicle's path between location measurements. In some examples, such inference is based on estimating the vehicle's forward velocity as well as rate for turn, while compensating for the unknown orientation of the smartphone. This information is combined with the map information to track possible locations for the vehicle. A feature of these embodiments is that trajectory mapping can augment the position measurements with sensors on the mobile device to add evidence to determine the path between measurements and/or to determine when such measurements are to be made. Infrequent measurements reduce power consumption and increase the device's battery lifetime. Determining when such measurements are made can make the best use of the available power to make the measurements when they can be expected to provide the most useful information.

In some embodiments, a decision to make a position measurement may be informed (e.g., triggered or avoided) by processing inertial or other sensor data. For example, if the inertial sensors indicate the vehicle has just turned, it may be beneficial to acquire a position estimate immediately, to determine the new road the vehicle has turned on to. As another example, if no new WiFi or Cellular position estimates have been seen for some distance, or time, a new GPS fix may be acquired to reduce algorithmic uncertainty about the location of the vehicle.

The decision about when to acquire a position reading can additionally be constrained by a total energy budget. Specifically, on current smartphones and mobile devices, the energy cost of acquiring a GPS fix can be quite high. Given a target number of GPS readings per day, G, and an expected number of driving hours H per day for a given user, the method limits itself to acquiring no more than G/(H*60) GPS samples per minute.

The value of G is estimated via a periodic probing process, whereby the battery level on the smartphone is continuously monitored for a short time period (ranging from minutes to hours) while the GPS is continuously samples at a high rate. If p percent of the battery is drained in this time period, and g gps samples are acquired, and the goal is to use no more than P percent of the battery per day, then G=P/(p/g).

To account for the fact that acquiring a GPS sample after the GPS has been off for some time uses more energy than continuously acquiring GPS, the method scales the value p by a factor f to obtain G=P/(p·f/g). The factor f may be estimated experimentally or by referring to the specifications of the GPS chipset used in the smartphone.

To estimate the number of hours of driving H a user performs per day, the method uses historical information about the user's behavior. Since a user's driving habits may change over time, H is adaptively estimated over time. Specifically, given that the user has driven $(t_1, \ldots t_n)$ minutes on each of the last n days where $t_1$ is the time driven on the current day, $H=a_1t_1+ \ldots +a_nt_n$, where $a_i$ is a weighting factor over the current day. Because H may vary on different days of the week, the method separately computes a H value for each day of the week, estimating H for day d using only historical drive data from day d. H values may also be estimated using an exponentially weighted moving average, to avoid keeping the entire historical vector of drive times. In the absence of historical driving information, a reasonable estimate of H, such as 2 hours, may be used.

The decomposition of functionality between the mobile device and server can be achieved in several different ways. Specifically, the process of matching position estimates to a map may be performed on the server, to avoid having to store map data on each mobile phone and facilitate the sharing of cache files across many drives and devices. However, in other examples, all processing may be done on the phone, to avoid any communication between the smartphone and the server. In a third example, to reduce the amount of data transmitted to the server, this processing of inertial data to estimate the speed and heading of vehicle may be done on the phone, and this data, along with position estimates may be transmitted to the server to perform matching of drive data to a map.

In one embodiment, for battery-efficiency, position observations are not sent to the server for processing (in the embodiment where the server does the processing) as soon as the observation is measured, but instead several observations are gathered over some period of time and then sent in one batch. Doing so allows the communication radio (WiFi or cellular) to be turned off rather than remain on continuously, saving energy. Moreover, because using the cellular radio (3G, 4G, or LTE, for example) may count against the user's data plan, such batching may also be used to wait until WiFi connectivity is available to the mobile device, at which time the collected position and other sensor observations may be transmitted to the server.

Implementations of the approaches described above may use software that includes instructions stored on non-transitory computer-readable media. The instructions are used to control operation of a data processor (e.g., a computer, a virtual machine) to perform some or all of the functions described above. For examples, such instructions control operation of a processor in a smartphone and/or operation of a server computer in communication with the smartphone. In some implementations, the instructions a smartphone are provided (e.g., as a "app") over a wireless network for installation on the smartphone.

It is to be understood that the foregoing description is intended to illustrate and not to limit the scope of the invention, which is defined by the scope of the appended claims. Other embodiments are within the scope of the following claims.

What is claimed is:

1. A method for map-based telematics comprising:
    acquiring data representing a sequence of position-related measurements $O_1, \ldots, O_t$ of a device traveling along segments s of a transportation network;
    processing data representing the position measurements to form a sequence of segment sets $S_0, \ldots, S_D$, each segment set being associated with a set of one or more position measurements in the sequence of position measurements; and
    applying a computer-implemented path forming procedure to form a path set between the segment sets $(S_0, S_D)$ including determining a plurality of subsequences of the sequence $S_0, \ldots, S_D$ and forming paths through the determined subsequences; and
    providing data representation of a characteristic of the traversal of the device based on the formed path set.

2. The method of claim 1 wherein determining the plurality of subsequences comprises determining substantially all subsequences of the sequence $S_1, \ldots S_{D-1}$.

3. The method of claim 1 wherein applying a computer-implemented path forming procedure to form the path set representing a traversal of the transportation network between a pair of segment sets $(S_0, S_D)$ further includes:
    determining a path set between segments in segment set $S_i$ and segments in segment set $S_j$,
    applying the path forming procedure to form a first intermediate path set representing traversal of the network between an intermediate pair of segments $(S_{i'}, S_{j'})$, where $i \leq i' < j' \leq j$; and
    determining the path set at least in part according to the formed first intermediate path set.

4. The method of claim 3 wherein applying the path forming procedure for the pair of segments $(S_i, S_j)$ further includes selecting a $k^{th}$ segment set $S_k$ that is intermediate to the $i^{th}$ and $j^{th}$ segment sets such that $i < k < j$, and wherein the first intermediate path set represents traversal between either segment sets $(S_i, S_k)$ or $(S_k, S_j)$.

5. The method of claim 4 wherein applying the path forming procedure for the pair of segments $(S_i, S_j)$ further includes applying the path forming procedure to form a second intermediate path set representing traversal of the network over between an intermediate pair of segment sets $(S_i, S_k)$ or $(S_k, S_j)$, and wherein determining the path set is according to the formed first intermediate path set and the formed second intermediate path set.

6. The method of claim 1 wherein the path forming procedure applied to a pair of segment sets $(S_a, S_b)$ forms a path set consisting of a single best path representing a path between a segment of $S_a$ and a segment of $S_b$.

7. The method of claim 1 wherein the path forming procedure applied to a pair of segment sets $(S_a, S_b)$ forms a path set comprising a plurality of best paths each best path representing a path between a pair of segments $(s_a, s_b)$ in the corresponding pair of segment sets $(S_a, S_b)$.

8. The method of claim 1 wherein at least one of the segment sets is associated with more than one of the position-related measurements.

9. The method of claim 8 further comprising grouping the position-related measurements, and forming each segment set according to a corresponding one of the groups of measurements.

10. The method of claim 1 wherein providing the data representation of the characteristic of the traversal of the device comprises providing data representing a path of the traversal of the device through the transportation network.

11. The method of claim 10 wherein determining a best path between a segment of $S_i$ and a segment of $S_j$ includes determining an overall score for the path by applying a pre-computed map-based score for traversal of the network between pairs of segments of segment sets $S_i$ and $S_j$.

12. The method of claim 11 determining a best path between a segment of $S_i$ and a segment of $S_j$ further includes applying measurement data acquired during travel of the device along the network in determining the overall score for the path.

13. The method of claim 12 wherein the measurement data comprises at least some of the position-related measurements.

14. The method of claim 12 wherein the method further comprises acquiring sensor measurement data at the device during the travel of the device, and the measurement data applied in determining the overall score for a path includes at least some of the sensor measurement data.

15. The method of claim 14 wherein the sensor measurement data comprises inertial measurement data.

16. The method of claim 14 wherein the sensor measurement data comprises acoustic measurement data.

17. The method of claim 1 wherein providing the data representation of the characteristic of the traversal of the device comprises providing data representing a distance of a path in the formed path set and a velocity characteristic of a traversal of a path in the formed path set.

18. The method of claim 1 wherein providing the data representation of the characteristic of the traversal of the device comprises providing driver risk data to an insurance provider.

19. The method of claim 1 wherein the path set between segments in segment set $S_i$ and segments in segment set $S_j$ consists of a single best path between a segment of $S_i$ and a segment of $S_j$.

20. The method of claim 1 wherein the position-related measurements comprise positioning system measurements.

21. The method of claim 20 wherein the positioning system measurements comprise satellite positioning system measurements.

22. The method of claim 1 wherein the position-related measurements comprise measurements based on radio transmissions between the device and stationary transmitters.

23. The method of claim 22 wherein the radio transmissions between the device and stationary transmitters comprise cellular telephone transmissions between the device and cellular telephone base stations.

24. The method of claim 22 wherein the radio transmissions between the device and stationary transmitters comprise transmissions from known wireless local area network stations to the device.

25. The method of claim 24 further comprising selecting whether to cause the acquisition according to a cost of the acquisition.

26. The method of claim 25 wherein the cost of the acquisition comprises a power consumption cost.

27. The method of claim 1 further comprising causing acquisition of further position-related measurements according to a result of the path forming procedure.

28. The method of claim 1 wherein the device comprises a personal communication device.

29. The method of claim 28 wherein the personal communication device travels within a vehicle along a road transportation network.

30. Software stored on a non-transitory computer-readable medium comprising instructions for causing a data processing system to:
- acquire data representing a sequence of position-related measurements $O_1, \ldots, O_t$ of a device traveling along segments s of a transportation network;
- process data representing the position measurements to form a sequence of segment sets $S_0, \ldots, S_D$, each segment set being associated with a set of one or more position measurements in the sequence of position measurements; and
- apply a path forming procedure to form a path set between the segment sets $(S_0, S_D)$ including determining a plurality of subsequences of the sequence $S_0, \ldots, S_D$ and forming paths through the determined subsequences; and
- provide data representation of a characteristic of the traversal of the device based on the formed path set.

* * * * *